(12) United States Patent
Mizrahi et al.

(10) Patent No.: US 11,916,795 B2
(45) Date of Patent: *Feb. 27, 2024

(54) SYSTEMS AND METHODS FOR STATEFUL PACKET PROCESSING

(71) Applicant: Marvell Israel (M.I.S.L) Ltd., Yokneam (IL)

(72) Inventors: Tal Mizrahi, Haifa (IL); David Melman, Tel Aviv (IL)

(73) Assignee: Marvell Israel (M.I.S.L) Ltd., Yokne'am (IL)

( * ) Notice: Subject to any disclaimer, the term of this patent is extended or adjusted under 35 U.S.C. 154(b) by 58 days.

This patent is subject to a terminal disclaimer.

(21) Appl. No.: 17/318,076

(22) Filed: May 12, 2021

(65) Prior Publication Data

US 2021/0266264 A1 Aug. 26, 2021

Related U.S. Application Data

(63) Continuation of application No. 16/176,640, filed on Oct. 31, 2018, now Pat. No. 11,025,549.

(60) Provisional application No. 62/623,955, filed on Jan. 30, 2018, provisional application No. 62/728,619, filed on Sep. 7, 2018.

(51) Int. Cl.
*H04L 47/2441* (2022.01)
*H04L 69/22* (2022.01)
*H04L 45/74* (2022.01)

(52) U.S. Cl.
CPC ......... *H04L 47/2441* (2013.01); *H04L 45/74* (2013.01); *H04L 69/22* (2013.01)

(58) Field of Classification Search
CPC .................................................. H04L 47/2441
See application file for complete search history.

(56) References Cited

U.S. PATENT DOCUMENTS

| 7,460,473 | B1* | 12/2008 | Kodama | H04L 47/34 370/392 |
| 11,025,549 | B2* | 6/2021 | Mizrahi | H04L 47/2441 |
| 2004/0223452 | A1 | 11/2004 | Santos et al. | |
| 2008/0192764 | A1 | 8/2008 | Arefi et al. | |
| 2009/0046581 | A1* | 2/2009 | Eswaran | H04L 43/0876 370/230 |
| 2010/0329118 | A1 | 12/2010 | Adams | |

(Continued)

OTHER PUBLICATIONS

Li, Xiangli, et al., "Application Technology of IPv6 Flow Label Used in DiffServ," *Microcomputer Information*, No. 26, Sep. 20, 2005.

*Primary Examiner* — Jason E Mattis

(57) ABSTRACT

Methods and systems are provided for processing a received packet based on associated state information. A packet processor of a network device receives a packet from a network. The received packet is classified as belonging to at least one respective identified flow from among a plurality of identified flows. For a respective received packet that belongs to an identified flow a current state value for the identified flow is ascertained based on a state table. The current state value is assigned to the respective received packet based on the current state value using the state table for the identified flow. A packet processing operation is subsequently performed on the respective received packet based in part on the state value of the identified flow to which the respective packet belongs.

20 Claims, 3 Drawing Sheets

(56) References Cited

U.S. PATENT DOCUMENTS

| | | |
|---|---|---|
| 2011/0134925 A1 | 6/2011 | Safrai et al. |
| 2012/0033553 A1* | 2/2012 | Strulo ............... H04L 47/32 370/232 |
| 2013/0155857 A1* | 6/2013 | Chrysos ............. H04L 47/30 370/235 |
| 2014/0029617 A1 | 1/2014 | Wang et al. |
| 2015/0163244 A1* | 6/2015 | Hoshino ............. H04L 63/164 726/22 |
| 2015/0281102 A1 | 10/2015 | Lee et al. |
| 2015/0295946 A1* | 10/2015 | Tang ............... H04L 65/1016 726/22 |
| 2016/0197822 A1 | 7/2016 | Huang |
| 2016/0197836 A1 | 7/2016 | Hussain et al. |
| 2017/0155590 A1* | 6/2017 | Dillon ............... H04L 43/0852 |
| 2017/0339062 A1 | 11/2017 | Mayer-Wolf et al. |
| 2021/0099930 A1* | 4/2021 | Yao ................. H04L 1/1841 |

* cited by examiner

SYSTEMS AND METHODS FOR STATEFUL PACKET PROCESSING

CROSS-REFERENCE TO RELATED APPLICATIONS

This application is a continuation application of U.S. patent application Ser. No. 16/176,640, filed Oct. 31, 2018, which claims the benefit under 35 U.S.C. § 119(e) of U.S. Provisional Patent Application No. 62/623,955, filed Jan. 30, 2018, and U.S. Provisional Patent Application No. 62/728,619, filed Sep. 7, 2018, the entire disclosures of which are hereby incorporated by reference herein.

FIELD OF USE

This disclosure generally relates to the field of data communications, and specifically, to methods and systems for processing packets by a network device based on packet headers and state information.

BACKGROUND OF THE DISCLOSURE

The background description provided herein is for the purpose of generally presenting the context of the disclosure. Work of the inventors hereof, to the extent the work is described in this background section, as well as aspects of the description that does not otherwise qualify as prior art at the time of filing, are neither expressly nor impliedly admitted to be prior art against the present disclosure.

A packet switch (or router) is a basic building block of data communication networks. The packet switch is configured to forward packets based on their content, and more specifically header data at the beginning of the packets. As part of the forwarding operation, packets are marked, assigned to a different network, dropped or the like. Typically, a packet switch includes an ingress path and an egress path, which handle the incoming and outgoing traffic. Each path contains a packet processor, which performs operations such as updating the header of a packet, inserting or removing data from the header of the packet, or in some instances, dropping specific packets.

It is often useful to classify packets received via a network based on information in the received packet headers and a state in the network device. Existing systems require implementing stateful behavior only for specific mechanisms. For example, when performing a policing operation, a dedicated policer engine maintains information about the number of packets/bytes received for a given flow at the network device to make a forwarding/filtering/remarking decision. However, in conventional systems, the dedicated policer engine is limited to the policing operation but does not consider state information of data packets for various packet processing operations.

SUMMARY

Methods and systems are provided for processing a received packet based on associated state information. A packet processor of a network device receives a packet from a network. The received packet is classified as belonging to at least one respective identified flow from among a plurality of identified flows. For a respective received packet that belongs to an identified flow a current state value for the identified flow is ascertained based on a state table. The current state value is assigned to the respective received packet based on the current state value using the state table for the identified flow. A packet processing operation is subsequently performed on the respective received packet based in part on the state value of the identified flow to which the respective packet belongs.

In some embodiments, performing the packet processing operation based in part on the state value of the identified flow includes performing one or more processing operations such as a forwarding operation to forward the respective received packet to one or more different destinations based at least in part on the state value, a packet mirroring operation to mirror the respective received packet one or more times based at least in part on the state value, or a quality-of-service (QoS) operation to apply a QOS level to the respective received packet based at least in part on the state value.

In some embodiments, ascertaining the current state value includes ascertaining the state value indicative of a number of previously received packets belonging to the identified flow.

In some embodiments, in response to classifying the received packet as belonging to at least one respective identified flow, the state value indicative of a number of previously received packets belonging to the respective identified flow is updated in the state table associated with the identified flow. The updated state value is indicative of a number of currently received packets belonging to the respective identified flow.

In some embodiments, updating the state value stored in the state table includes setting an initial value of the state value equal to a pre-defined number and decrementing the state value by 1 for each received packet belonging to the identified flow.

In some embodiments, performing a packet processing operation on the respective received packet based in part on the state value of the flow to which the respective packet belongs, further includes performing a first packet processing operation on the respective received packet when the state value equals a non-zero value, and performing a second packet processing operation, different from the first packet processing operation, on the respective received packet when the state value equals zero.

In some embodiments, performing a packet processing operation on the respective received packet based in part on the state value of the flow to which the respective packet belongs further includes mirroring the respective received packet to a central processing unit (CPU) when the state value equals a non-zero value.

In some embodiments, a metadata value associated with the respective received packet equal is assigned a value V1 when the state value is equal to a target value. The metadata value associated with the respective received packet equal is assigned a value V2 when the state value is not equal to the target value. Moreover, the packet processing operation on the respective received packet is performed based on the metadata value associated with the respective received packet.

In some embodiments, performing the packet processing operation on the respective received packet based on the metadata value associated with the respective received packet includes adding telemetry information to the respective received packet when the metadata value associated with the respective received packet is equal to the value V1 indicative of the state value being equal to the target value.

In some embodiments, classifying the received packets as belonging to at least one respective identified flow from among the plurality of identified flows includes identifying the flow from the plurality of identified flows based on a packet header and attributes of the respective received packet, and accessing a state table corresponding to the identified flow, the state table being indicative of a number of received packets assigned to the respective flow.

In an embodiment of the present disclosure, a network device is provided for processing a received packet based on associated state information. The network device includes a packet processor configured to receive packets from a network. The network device also includes control circuitry configured to classify a received packet as belonging to at least one respective identified flow from among a plurality of identified flows, and for a respective received packet that belongs to an identified flow: ascertain, based on a state table, a current state value for the identified flow, assign, using the state table for the identified flow, the current state value to the respective received packet based on the current state value, and perform a packet processing operation on the respective received packet based in part on the state value of the identified flow to which the respective packet belongs.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

Figure 1:
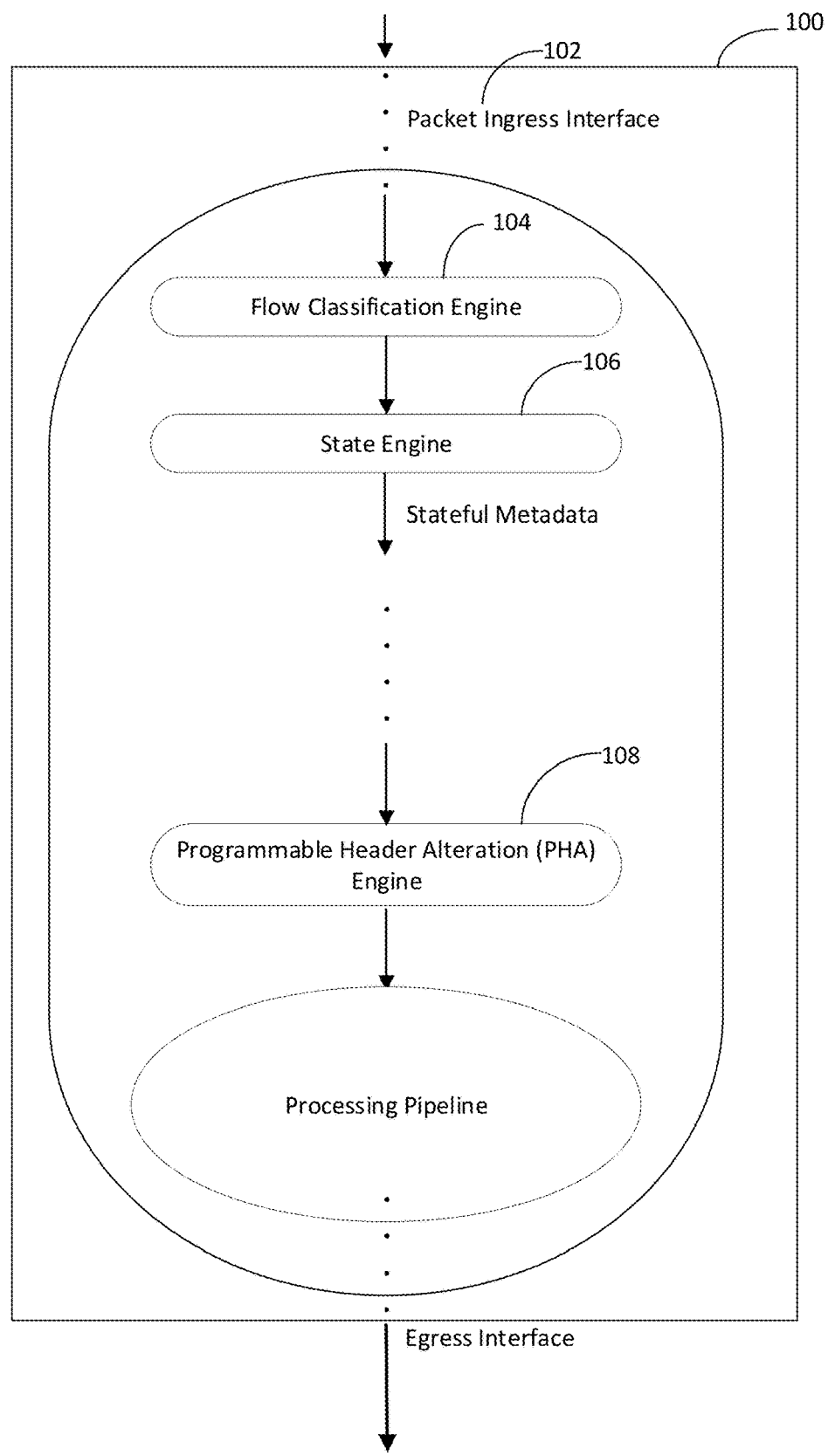
FIG. 1 illustrates a network device in accordance with the disclosed embodiments.

This disclosure describes methods and systems for stateful packet processing for a stream of packets received at a network device. Specifically, in accordance with an implementation, a network device processes a packet received at an ingress interface based on an assigned flow and a current state value indicative of a history of previously received packets within the assigned flow.

Network devices, such as switches, bridges and routers, sometimes are implemented using a pipelined hardware architecture in which the different entities of a processing pipeline recognize and process a stream of network packets at high data rates, for example, up to 100 Gigabits per second. It is noted that although the present disclosure is discussed in the context of a pipelined hardware architecture (e.g., an application-specific integrated circuit (ASIC) pipeline), the disclosure is not so limited, and the methods and systems discussed herein can be implemented in programmable processors having various architectures. For example, in some implementations, network devices are implemented as a plurality of programmable processing engines coupled together as a pipeline. In still other implementations, network devices are implemented as a multiplicity of programmable processing engines each operating as a run-to-completion processing engine.

For example, in an implementation, a pipeline in a network device processes packets received by the device and then forwards the packets to appropriate egress ports of the device. The packets are forwarded to one or more egress ports of the device according to a forwarding decision, which are based on one or more fields of one or more headers present within the frame.

Some network devices employ one or more "processing engines" that perform various packet-processing operations, such as a policing operation. In some embodiments, the network devices employ processing engines that are implemented as ASIC devices in an ASIC pipeline. It is noted that network devices, in some embodiments, employ processing engines that are implemented as software modules in programmable packet processors. Network devices, therefore, are required to include dedicated processing engines to perform the desired processing operations. However, the packet-processing operation capability of the network device is limited by the specific dedicated engines included within the network device, because conventional network devices are often preconfigured to perform only a limited number of packet-processing operations based on the specific dedicated processing engines included therein.

Accordingly, methods and techniques for generic stateful packet processing in a network device are disclosed. More specifically, methods and techniques are provided for assigning different packet processing operations based on a combination of classifying a received packet to a particular flow and performing a packet processing operation on the received packet based on state information maintained for the assigned flow. Example methods and apparatus are described herein in the context of Ethernet networks. It is noted, in light of the disclosure and teachings herein, that similar methods and apparatus are suitable for use in other suitable communication networks as well. Therefore, it is intended for this disclosure and the following claims to cover all suitable communication networks.

The methods and processes described in the detailed description section are, in some implementations, embodied as code and/or data, which are stored in a non-transitory computer-readable storage medium. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described below are, in some implementations, included in hardware modules. For example, in various implementations, the hardware modules include, but are not limited to, ASIC chips, field-programmable gate arrays (FPGAs), tables stored in memory arrays, and other programmable-logic devices now known or later developed. When the hardware modules are activated, the hardware modules perform the methods and processes included within the hardware modules. In some implementations, the methods and processes described below are included in software modules.

FIG. 1 is a block diagram illustrating a network device 100, according to some embodiments described herein. Network device 100 includes a packet ingress interface 102 where a stream of packets is received to be processed and routed to their respective destinations. The network device 100 further includes a flow classification engine 104 configured to assign each of the received packets to a respective flow. For example, in an implementation, the flow classification engine 104 assigns the received packets to different flows using known classification methods such as a Ternary Content Addressable Memory (TCAM) lookup or an exact-match lookup method. It is noted that the above-referenced flow classification methods are for example purposes only and that the received stream of packets are classified using any number of known flow classification methods in various implementations.

The network device 100 further includes a state engine 106. The state engine 106 has a state table which stores a state for each flow, a state update logic which updates the state of the respective flow in response to receiving a packet, and a packet command assignment logic which assigns a packet command to each packet based on the value of the respective state, in an implementation. The contents of the state engine 106 are described below in greater detail with reference to FIG. 2.

In an embodiment, the state engine 106 updates the metadata of the received packet to include state information. The metadata for the received packet is made up of any information related to the packet that is not directly taken from the packet header or payload, and specifically contains information about the state. For example, the metadata for the packet is made up of the value of the state. In an embodiment, the metadata of the packet is assigned a value V1 when the state is equal to zero and a value V2 when the state is equal to a non-zero value. As will be discussed below, the metadata value is used to perform different pre-configured actions on the received packet.

The network device 100 also includes a Programmable Header Alteration (PHA) engine 108 configured to use the state information. In some embodiments, the PHA engine 108 performs flexible header modification to the received packets based on metadata associated with the respective packets and based on programmable microcode that is used in the PHA engine 108. In some embodiments, the PHA engine 108 uses the state information updated by the state engine 106. For example, in an implementation, the PHA engine 108 applies different microcode threads to different metadata values, or uses the metadata in the microcode, thereby creating conditional code sections for different metadata values.

As illustrated in FIG. 1, the various engines are provided in a 'pipeline' architecture, in an implementation. It is noted that each of the described engines above is implemented as a sub-block of another engine in the pipeline. Moreover, in some implementations, additional engines are provided between each of the engines described above.

Figure 2:
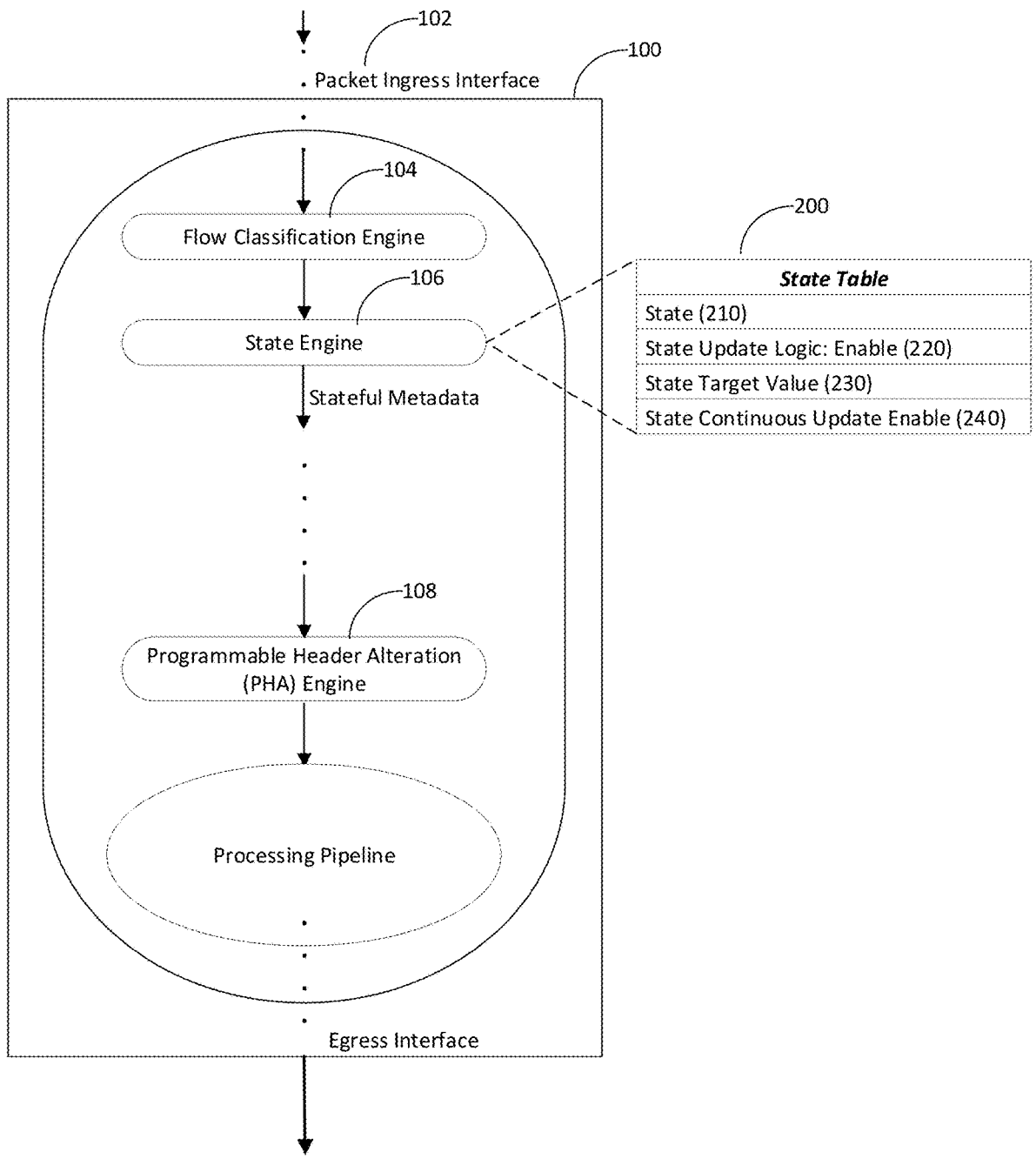
FIG. 2 illustrates a specific implementation of the network device having a state table in accordance with the disclosed embodiments.

FIG. 2 is a block diagram illustrating a state table 200 within a network device 100, according to some embodiments described herein. As discussed above, the network device 100 seen in FIG. 2 includes a state engine 106. The state engine 106 includes, or is coupled to, a state table 200 configured to store state information for each of the plurality of identified flows. As shown in FIG. 2, the state table 200 for an identified flow includes an entry for a state 210 indicative of a number of previously received packets belonging to the identified flow. The state table 200 for the identified flow further includes an entry for a state update logic 220. In accordance with an embodiment, when the state update logic 220 is set to "Enable", the state 210 is updated in response to the respective received packet being assigned to the identified flow.

In accordance with disclosed methods and systems here, the value of the state 210 is updated for each packet in the flow. As discussed above, state 210 is indicative of a number of previously received packets belonging to the identified flow. For example, the state 210 indicates a sequential location of a current received packet in a stream of packets classified as belonging to the identified flow. In some embodiments, the state 210 is decremented by 1 in response to each packet being classified as belonging to the identified flow. For example, in some embodiments, the state is implemented by a register that is initialized to a first value V and decremented by 1 for each received packet belonging to the identified flow.

In some embodiments, the state engine 106 is configured to reset the state to the value after reaching the value 0 and subsequently receiving a packet assigned to the respective flow.

As shown in FIG. 2, the state table 200 also includes an entry for a state target value 230. The entry for state target value 230 defines pre-configured actions to be performed (e.g., packet commands) when the state reaches the pre-defined target value. For example, in some embodiments, when the state 210 reaches a pre-defined target value (e.g., N1), the state engine 106 assigns a first pre-configured packet command to the respective received packet. The pre-configured packet command, in accordance with one embodiment, is a packet mirroring command to mirror the respective received packet one or more time.

In some embodiments, the state target value 230 stores more than one target values with each target value being assigned a different packet command. For example, in some embodiments, when the state 210 reaches a second pre-defined target value (e.g., N2), the state engine 106 assigns a second pre-configured packet command to the respective received packet. The pre-configured packet command, in accordance with one embodiment, is a quality-of-service (QOS) operation to apply a QOS level to the respective received packet. It is noted that the first and second pre-configured packet commands discussed above are only examples, and that, in various embodiments, the state engine 106 assigns any number of suitable pre-configured commands based on one or more state target values stored in state target value 230.

As further illustrated in FIG. 2, the state table 200 for the identified flow also includes an entry for a state continuous update logic 240. The state continuous update logic 240 determines whether the state 210 is continuously updates after reaching the state target value as defined in the entry for the state target value 230, or the state 210 is fixed at the Target value once it is reached. In accordance with an embodiment, when the state continuous update logic 240 is set to "Enable", the state 210 continues to be updated (e.g., continues to be decremented by 1) after the state 210 reaches the target value as defined in the entry for the state target value 230. In accordance with an embodiment, when the state continuous update logic 240 is set to "Disable", the state 210 is not updated after the state 210 reaches the target value as defined in the entry for the state target value 230 (i.e., state 210 stays at pre-defined target value N1). As will be described below in greater detail, different packet commands are assigned to the packets based on the corresponding state 210, in accordance with various embodiments.

A pathway of a received packet will be described below in accordance with an embodiment of the present disclosure in which the network device is configured to assign a first packet command on the first N packets in the identified flow. A packet is received through the ingress interface 102. The classification engine 104 classifies the received packet as belonging to at least one respective identified flow from among a plurality of identified flows. For example, in some embodiments, the received packet is assigned to one of the plurality of identified flows based on information extracted from a header of the received packet, such as a destination, a packet type, an application type, quality-of-service, or the like.

The state engine 106 accesses the state table 200 for the identified flow (e.g., based on a flow identifier assigned by the classification engine 104) to determine the state associated with the received packet. The state 210 is updated by the state engine 106 in response to the respective received packet being assigned to the identified flow. Moreover, the state 210 is compared to the state target value 230 to determine whether the pre-defined target value N has been reached. If the state 210 has not reached the pre-defined target value N, the first packet command is assigned to the respective received packet. For example, in one implementation, the respective received packet is assigned a mirroring operation and a higher layer processing operation (e.g., performing processing operation at a higher level such as Transport Layer processing operation). If, on the other and, the state 210 has reached the pre-defined target value N, the first packet command is not assigned to the respective received packet a mirroring operation and a higher layer processing operation (e.g., performing processing operation at a higher level such as Transport Layer processing operation) are not assigned to the respective received packet.

In an embodiment, the network device is configured to assign a second packet command (e.g., deep packet inspection on the payload of the packet) to every Nth packet within the assigned flow. The state engine 106 monitors the state table 200 to compare the state 210 with the state target value 230 to determine which packet command to assign to the respective received packet. For example, in an implementation, the network device 100 assigns the first packet command (e.g., a mirroring operation) to the respective received packet when the corresponding state 210 is not equal to the state target value 230, and assigns the second packet command (e.g., a deep packet inspection on the payload of the packet) to the respective received packet when the corresponding state 210 is equal to the state target value 230.

As discussed above, the metadata for the respective received packets is updated based on the state 210 within the assigned flow in accordance with an embodiment. For example, when the metadata is set to value V1 (i.e., when the state 210 is equal to zero), the PHA engine is configured to do nothing. However, in one implementation, when the metadata is set to value V2 (i.e., when the state 210 is equal to a non-zero value), the PHA engine is, for example, configured to add telemetry information to the received packets. For example, in some implementations, the telemetry information includes one or more of switch-level information (e.g., switch id), ingress information (e.g., ingress port id, ingress timestamp), buffer information (e.g., queue occupancy, queue congestion status), and the like.

Figure 3:
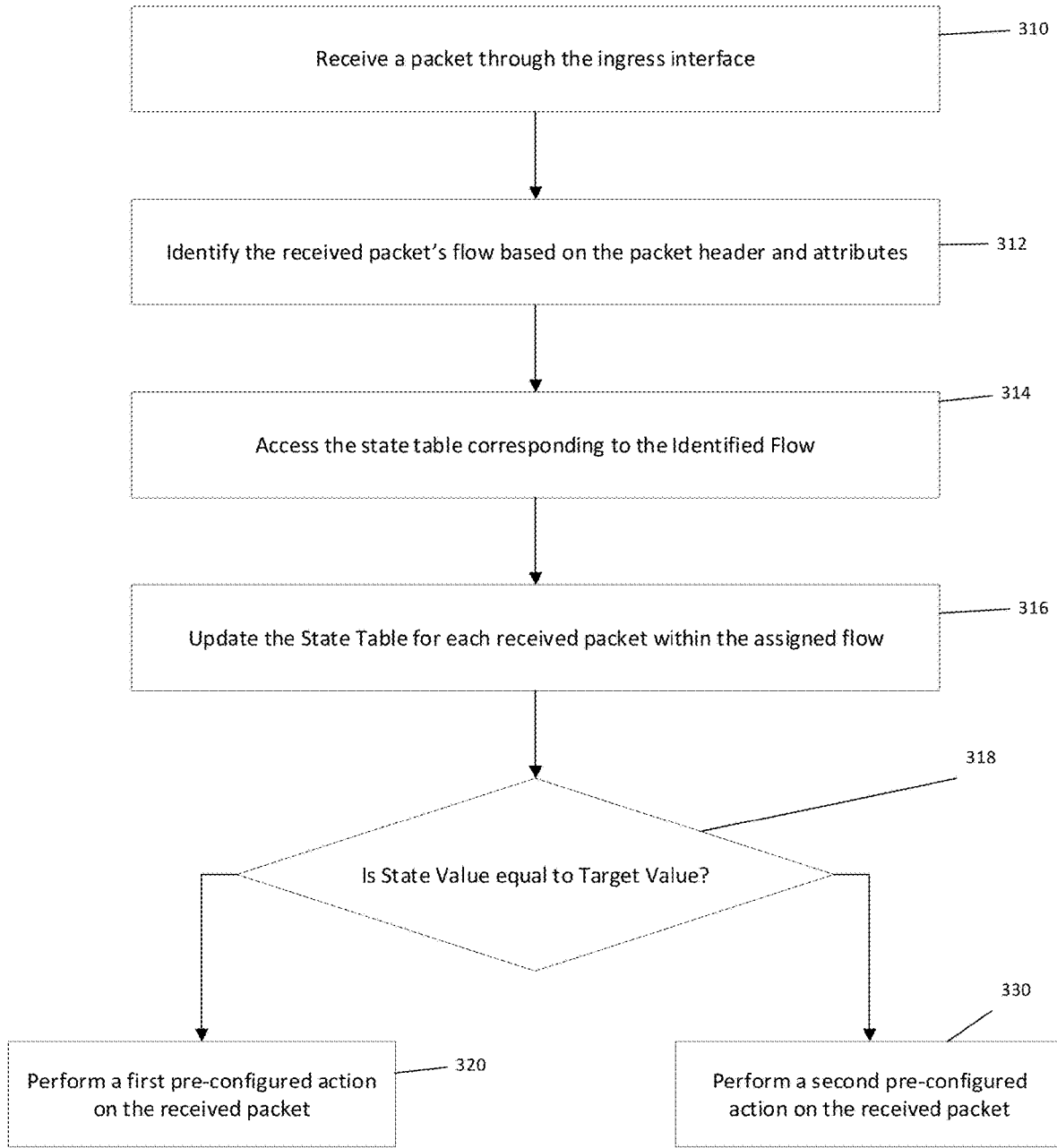
FIG. 3 presents a flow chart illustrating a process for processing a received packet based on associated state information in accordance with the disclosed embodiments.

FIG. 3 provides a flow chart illustrating a process for processing a received state packet based on associated state information in accordance with the disclosed embodiments. At step 310, a packet is received through the ingress interface 102 of the network device 100. At step 312, the classification engine 104 determines the packet's flow based, for example, on data in fields of the packet header, attributes such as a port where the packet is received and other metadata that is generated for the packet. Specifically, in an example, the received packet is assigned to one of the plurality of flows based on information extracted from a header of the received packet, such as destination, a packet type, an application type, quality of service, or the like. At step 314, a state table is accessed based on the flow ID. That is, the state engine 106 stores a respective state table 200 for each of the flows, and a state table corresponding to the flow to which the received packet is assigned is accessed.

At step 316, the state 210 is updated in the state table 200 corresponding to the assigned flow. For example, the state value decrements by 1 each time a packet is assigned to the respective flow. At step 318, the state 210 is compared to the state target value 230 to determine the pre-configured action to perform on the received packet. As discussed above, a first pre-configured action 320 is performed when the state 210 is not equal to the state target value 230, and a second pre-configured action 330 is performed when the state 210 reaches the state target value 230.

Various embodiments discussed in conjunction with FIGS. 1-3 are performed by various electronic components of one or more electronic circuits, such as but not limited to an integrated circuit, application-specific integrated circuit (ASIC), programmable processor, and/or the like. Various components discussed throughout this disclosure such as, but not limited to network devices (e.g., 100 in FIG. 1), and/or the like, are configured to include a set of electronic circuit components, and communicatively operate on one or more electronic circuits. Each electronic circuit is configured to include any of, but not limited to logic gates, memory cells, amplifiers, filters, and/or the like. Various embodiments and components disclosed herein are configured to be at least partially operated and/or implemented by processor-executable instructions stored on one or more transitory or non-transitory processor-readable media.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed.

What is claimed is:

1. A method for processing a received packet based on associated state information, the method comprising:
receiving, at a packet processor of a network device, packets from a network;
classifying a received packet as belonging to at least one respective identified flow from among a plurality of identified flows;
for a respective received packet that belongs to an identified flow:
updating a current state value for the identified flow based on receipt of the respective received packet;
recording a value based on the updated current state value with the respective received packet, wherein the updated current state value is indicative of a sequential location of the respective received packet in a stream of previously received packets belonging to the identified flow;
performing a first packet processing operation on the respective received packet based in part on the recorded updated current state value being equal to a first state value; and
performing a second packet processing operation on the respective received packet based in part on the recorded updated current state value being equal to a second state value, wherein the second packet processing operation is different from the first packet processing operation and the second state value is different from the first state value.

2. The method of claim 1, further comprising one of:
incrementing the current state value in response to classifying the received packet as belonging to at least one respective identified flow; or
decrementing the current state value in response to classifying the received packet as belonging to at least one respective identified flow.

3. The method of claim 1, wherein recording the current state value with the respective received packet comprises:
updating a header of the received packet to indicate the recorded updated current state value.

4. The method of claim 3, further comprising:
performing the first processing operation on the respective received packet based on the updated header of the received packet.

5. The method of claim 3, further comprising:
performing the second packet processing operation on the respective received packet based on the updated header of the received packet.

6. The method according to claim 1, further comprising:
recording a first value based on the current state value with the respective received packet when the current state value is equal to a target value; and
recording a second value based on the current state value with the respective received packet when the current state value is not equal to the target value, wherein the second value is different from the first value.

7. The method according to claim 6, further comprising:
adding telemetry information to the respective received packet when the value recorded with the respective received packet is the first value.

8. The method according to claim 1, further comprising:
recording a first value with the respective received packet when the current state value is equal to a zero-value; and
recording a second value with the respective received packet when the current state value is equal to a non-zero value, wherein the second value is different from the first value.

9. The method according to claim 7, further comprising:
mirroring the respective received packet to a central processing unit (CPU) when the value recorded with the respective received packet is the second value.

10. The method according to claim 1, wherein classifying the received packets as belonging to at least one respective identified flow from among the plurality of identified flows comprises:
identifying the flow from the plurality of identified flows based on a packet header and attributes of the respective received packet; and
accessing a state table corresponding to the identified flow, the state table being indicative of a number of received packets assigned to the respective flow.

11. A network device for processing a received packet based on associated state information, the network device comprising:
a packet processor configured to receive packets from a network; and
control circuitry configured to:
classify a received packet as belonging to at least one respective identified flow from among a plurality of identified flows;
for a respective received packet that belongs to an identified flow:
update a current state value for the identified flow based on receipt of the respective received packet;
record the updated current state value with the respective received packet, wherein the updated current state value is indicative of a sequential location of the respective received packet in a stream of previously received packets belonging to the identified flow;
perform a first packet processing operation on the respective received packet based in part on the recorded updated current state value being equal to a first value; and
perform a second packet processing operation on the respective received packet based in part on the recorded updated current state value being equal to a second state value, wherein the second packet processing operation is different from the first packet processing operation and the second state value is different from the first state value.

12. The network device of claim 11, wherein the control circuitry is further configured to one of:
increment the current state value in response to classifying the received packet as belonging to at least one respective identified flow; or
decrement the current state value in response to classifying the received packet as belonging to at least one respective identified flow.

13. The network device of claim 11, wherein the control circuitry, when recording the current state value with the respective received packet, is configured to:
update a header of the received packet to indicate the recorded updated current state value.

14. The network device of claim 13, wherein the control circuitry is further configured to:
perform the first processing operation on the respective received packet based on the updated header of the received packet.

15. The network device of claim 13, wherein the control circuitry is further configured to:
perform the second packet processing operation on the respective received packet based on the updated header of the received packet.

16. The network device according to claim 11, wherein the control circuitry is further configured to:
record a first value based on the current state value with the respective received packet when the current state value is equal to a target value; and
record a second value based on the current state value with the respective received packet when the current state value is not equal to the target value, wherein the second value is different from the first value.

17. The network device according to claim 16, wherein the control circuitry is further configured to:
add telemetry information to the respective received packet when the value recorded with the respective received packet is the first value.

18. The network device according to claim 11, wherein the control circuitry is further configured to:
record a first value with the respective received packet when the current state value is equal to a zero-value; and
record a second value with the respective received packet when the current state value is equal to a non-zero value, wherein the second value is different from the first value.

19. The network device according to claim 17, wherein the control circuitry is further configured to:
- mirror the respective received packet to a central processing unit (CPU) when the value recorded with the respective received packet is the second value.

20. The network device according to claim 11, wherein the control circuitry, when classifying the received packets as belonging to at least one respective identified flow from among the plurality of identified flows, is further configured to:
- identify the flow from the plurality of identified flows based on a packet header and attributes of the respective received packet; and
- access a state table corresponding to the identified flow, the state table being indicative of a number of received packets assigned to the respective flow.

* * * * *